United States Patent [19]

Hunziker

[11] Patent Number: 5,425,440
[45] Date of Patent: Jun. 20, 1995

[54] DEVICE FOR THE CONTINUOUS CONVEYING AND TURNING OF WORKPIECES

[76] Inventor: Werner Hunziker, Im Köpfli 262, CH-5054 Kirchleerau, Switzerland

[21] Appl. No.: 188,523

[22] Filed: Jan. 28, 1994

[30] Foreign Application Priority Data

Feb. 3, 1993 [CH] Switzerland .............. 320/93

[51] Int. Cl.$^6$ ............................................ B65G 47/24
[52] U.S. Cl. ..................... 198/373; 198/700; 198/804
[58] Field of Search ................. 198/373, 658

[56] References Cited

U.S. PATENT DOCUMENTS

| | | | |
|---|---|---|---|
| 2,418,854 | 4/1947 | Smith | 401/85 |
| 3,839,356 | 8/1974 | Hunziker | 198/782 X |
| 4,218,854 | 8/1980 | Hunziker | 451/86 |
| 4,368,599 | 1/1983 | Hunziker | 198/804 X |
| 4,844,232 | 7/1989 | Hunziker | 198/658 X |
| 5,018,318 | 5/1991 | Hunziker | 198/658 X |
| 5,105,587 | 4/1992 | Hunziker | 198/658 X |

FOREIGN PATENT DOCUMENTS

| | | |
|---|---|---|
| 0205738 | 12/1986 | European Pat. Off. . |
| 289845 | 11/1988 | European Pat. Off. . |
| 372454 | 6/1990 | European Pat. Off. . |
| 2359047 | 2/1978 | France . |
| 2035557 | 1/1972 | Germany . |
| 2365863 | 10/1976 | Germany . |
| 4013913 | 2/1992 | Germany . |

Primary Examiner—Cheryl L. Gastineau
Attorney, Agent, or Firm—Martin A. Farber

[57] ABSTRACT

A device for continuous conveying and turning of workpieces has a drivable, endless, flexible troughed belt (12) with a plurality of bars, parallel in the direction of conveyance (F) and articulated to each other. In order to form the trough, each of the ends of the troughed belt is guided around a ring (14) or a circular disk 13 parallel to a reference plane ($S_6\beta$), respectively, as well as two guide rollers (10, 10', 11, 11') which are paraxial to the circular disk and the ring. For disturbance-free conveyance of large and small workpieces, the reference plane ($S_6\beta$) forms a line of intersection ($S_6$), inclined (angle $\alpha$) to the direction of conveyance (F), with a horizontal plane and the ends of the bars (18) are swingable around a swing axis (26) which is perpendicular to the direction of rotation (arrow 17) of the troughed belt (12), the axis being in each case oriented in the region of the circular disk (13) and the ring (14) respectively and of the guide rollers (10, 10', 11, 11') radially to their axes of rotation.

14 Claims, 4 Drawing Sheets

DEVICE FOR THE CONTINUOUS CONVEYING AND TURNING OF WORKPIECES

FIELD AND BACKGROUND OF THE INVENTION

The present invention relates to a device for the linear conveying of bodies (1) by a drivable endless flexible troughed belt (12) which has a plurality of bars (18) which are parallel to each other in the direction of conveyance (F) and articulated to each other and each of the ends of which is guided, in order to form the trough, around a circular disk (13) which is parallel to a reference plane ($S_6\beta$) or a ring (14).

A troughed belt conveyor of this type is known from U.S. Pat. No. 4,218,854. In that known device, the conveying action of the rotating troughed belt is obtained by a helically extending rib. This has the result that only workpieces which are present between the ribs and moved forward by them are subjected to the conveying action. If the workpieces are too large, so that they rest on two adjacent ribs, they turn on the spot without being transported further in the troughed belt conveyor. Adaptation of the distance between ribs to the size of the workpieces is possible only to a limited extent.

From EP-A-205 738, 289 845 and 372 454 there is furthermore known a device for the continuous conveying and turning of workpieces which has a tubular, cage-like shell the ends of which are connected with rotating annular disks. These annular disks are directed parallel to a vertical reference plane which intersects the axis of rotation of the shell at an acute angle. This device is able to convey and turn small workpieces only if they do not get caught in the network of the shell, as well as large workpieces. However, at times the danger arises that they jam and cause a back-up in the flow of production.

SUMMARY OF THE INVENTION

The object of the present invention is to improve a device of the aforementioned type in such a way as to eliminate the disadvantages indicated.

According to the invention, the reference plane ($S_6\beta$) forms a line of intersection ($S_6$) inclined (angle $\alpha$) to the direction of conveyance (F) with a horizontal plane and the ends of the troughed belt are so guided on the circular disk (13) and the ring (14) that the bars (18) are swingable on their path of rotation around a first axis of swing which is parallel to the path of rotation.

The invention has the advantage that it covers, with respect to the size of the parts which can be transported, a substantially broader spectrum than any previously known machine and that it is furthermore simpler in construction than the previously known machines.

According to other features, the troughed belt (12) together with the circular disks (13) or rings (14) are guided or supported on guide rollers (10, 10', 11, 11') which are paraxial to said disks or rings.

By these features, the arrangement in series of two or more troughed belt conveyors is substantially facilitated since the ring of the preceding troughed belt conveyor forms for the adjoining one the circular disk through which the workpieces slide onto the lower second troughed belt.

According to still another feature, the reference plane ($S_6\beta$) intersects a horizontal plane at an acute angle ($\beta$).

Still a further feature is that the ends of the bars (18) are swingable, in addition, around a secon swing axis (26) which is perpendicular to the first swing axis.

Still according to other features of the invention, the troughed belt (12) has on each of its ends an endless strand (23) and that the ends of the bars (18) are fastened to the strand (23) swingable around at least the first of the two axes of swing.

Another aspect of the invention is that the ends of the bars (18) are secured against displacement in longitudinal direction in the region of the circular disk (13) and the ring (14) as well as of the guide rollers (10, 10', 11, 11').

Also according to the invention, the ends of the bars (18) are held form-locked, with clearance, in the longitudinal direction of the bars by the circular disk (13) and the ring (14) as well as the guide rollers (10, 10', 11, 11').

Furthermore, by a feature, each of the ends of the troughed belt (12) engages in form-locked manner with a guide roller (11, 11') and the two guide rollers (11, 11') are driven synchronously in the same direction.

Moreover, the ends of the bars (18) have, on both sides, projections (29, 30) which engage into depressions (31, 32) on the circumferential surfaces of the circular disk (13) and the ring (14) and of the guide rollers (10, 10', 11, 11').

Also according to the invention, the depressions (31) in the guide rollers (11, 11') which are driven in the same direction, are developed as holes which engage with the projections (29), and the depressions (31, 32) in the circular disk (13) and ring (14) and the other guide rollers (10, 10') are annular grooves.

Another feature of the invention provides that the projections (29, 30) are developed in the form of spherical heads.

Still the invention has the feature that, above the trough, slinger wheels (4) or jet nozzles are arranged, the jet cone of which is directed into the trough.

Another feature of the invention is that the preceding flank in the direction of rotation (17) is directed approximately horizontally.

BRIEF DESCRIPTION OF THE DRAWINGS

With the above and other objects and advantages in view, the present invention will become more clearly understood in connection with the detailed description of preferred embodiments when considered with the accompanying drawing, of which.

DETAILED DESCRIPTION OF THE PREFERRED EMBODIMENTS

Figure 1:
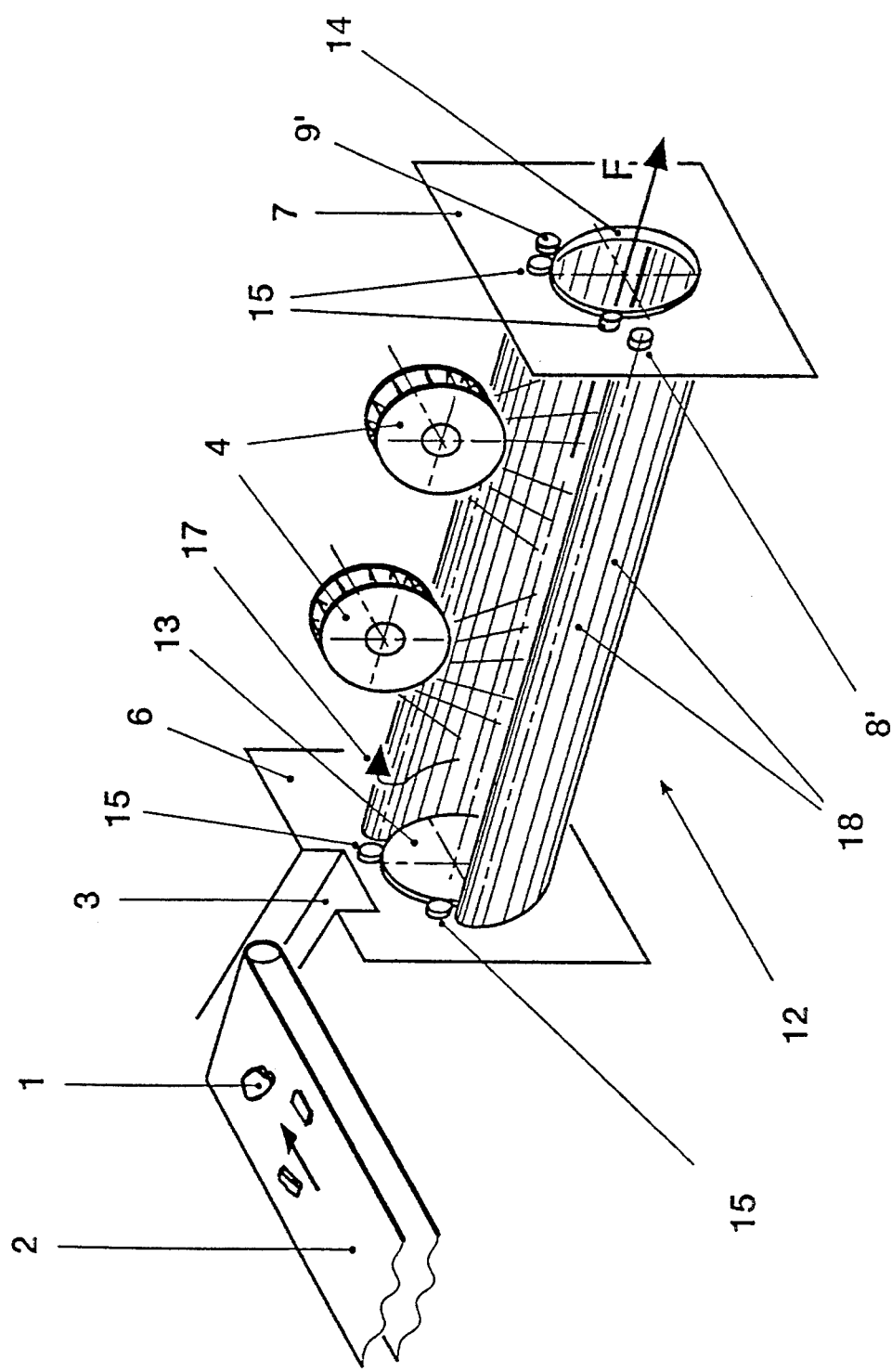
FIG. 1 is a perspective view of a troughed belt conveyor for small parts.

FIG. 1 shows a conveying device in accordance with the invention (hereinafter referred to as troughed belt conveyor), which serves for the blasting of smaller workpieces 1. The workpieces 1 are fed by means of a belt conveyor 2 and transferred to a chute 3, from where they slide into the troughed belt conveyor. On the latter, they are continuously turned and transported in the direction of conveyance (arrow F). Above the troughed belt conveyor there are arranged one or two—in this case two—slinger wheels 4, the jet cones of which are directed into the trough and through which the workpieces 1 move, rotating, in the direction of conveyance F. Adjoining the troughed belt conveyor there may be a discharge sluice with a chute or spiral (not shown). However, it may also have adjacent to it a second troughed belt conveyor the purpose of which is to remove the blasting agent which has remained in the workpieces 1. By insertion of curtains, the second troughed belt conveyor can also serve as a sluice.

At its ends, the troughed belt conveyor is limited by the two plate-shaped end pieces 6, 7 which are aligned parallel to a reference plane. This reference plane is perpendicular to a horizontal plane.

Figure 2:
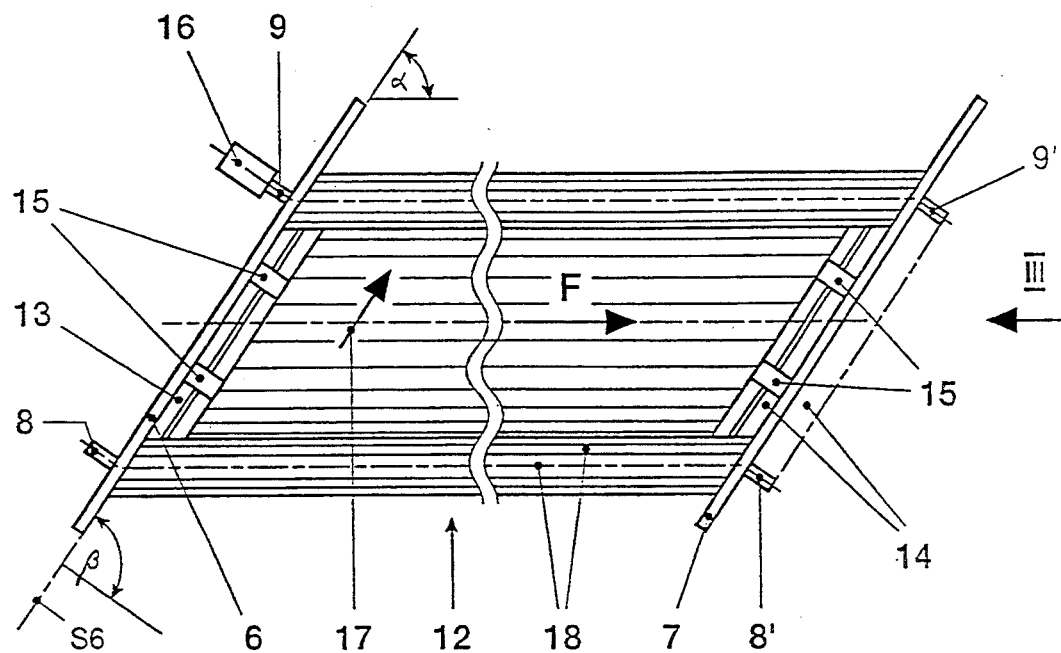
FIG. 2 is a top view of the troughed belt conveyor of FIG. 1.

Its trace $S_6$, i.e. its line of intersection with the horizontal plane, forms an acute angle $\alpha$ with the direction of conveyance F (FIG. 2). The end pieces 6 and 7 are connected together to form a machine stand by braces, not shown. In the drawing, the angle $\alpha$ has been shown small for ease in showing. Its optimal size would, as a rule, be about 80°.

Figure 3:
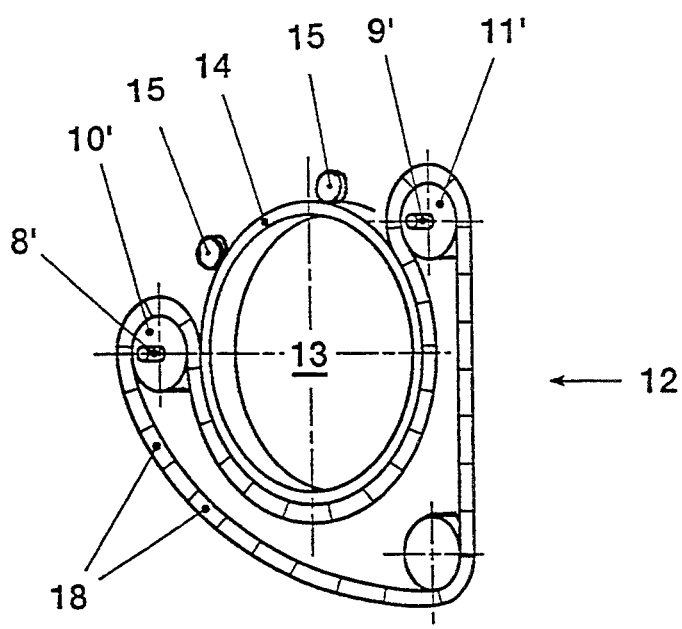
FIG. 3 is a view of the troughed belt conveyor of FIG. 2 seen in the direction indicated by the arrow III.

In each of the end pieces 6, 7, there are rotatably mounted two stub shafts 8, 9 and 8', 9' respectively which are directed at right angles to the end pieces. On these stub shafts there are seated, fixed for rotation on the facing end-piece sides, in each case, a guide roller 10, 11 and 10', 11' respectively. Over them, there is conducted in each case the end region of an endless troughed belt 12 which is flexible in the manner of a venetian blind. As shown in FIG. 3, another pair of guide rollers can be arranged below the trough, similar to the pair of guide rollers 10, 10' and 11, 11'. The inside shape of the trough is determined by a cantilevered circular disk 13 and a cantilevered ring 14 of the same outside diameter, which are supported at the ends of the trough in the plane of the guide rollers 10, 11 and 10', 11', against the troughed belt 12 on the one side and support rollers 15 on the other side. The latter are mounted for free rotation in the end pieces 6, 7.

The stub shaft 9 and, as will be explained further below, also the stub shaft 9', are provided with a drive motor 16 which drives the guide roller 11 so that the troughed belt 12 rotates in the direction of the arrow 17. The circular disk 13 and the ring 14 are in this connection carried along by the troughed belt 12 which engages by friction on their periphery. The workpieces 1 which are thrown from the belt conveyor 2 into the trough are carried along in the direction of the arrow 17 by the rotating troughed belt 12. In the region of the troughed belt 12 lying below the axis of rotation of the circular disk 13, the bars 18 of the troughed belt carry out a movement in the direction of conveyance F. As soon as the workpieces carried along by the troughed belt 12 in the direction of the arrow 17 have moved up a certain distance on the ascending flank of the trough, they have at the same time moved a distance in the direction of conveyance F. If the trough flank is too steep, they roll backwards onto the bottom of the trough and are again carried along from there. This process is repeated until the workpieces have reached the end of the troughed belt conveyor, where they are removed through the cantilevered ring 14. The ring 14 can extend through the end piece 7 (indicated in dash-dot line in FIG. 2) and exert the function of the circular disk 13 for an adjoining troughed belt conveyor.

Figure 4:
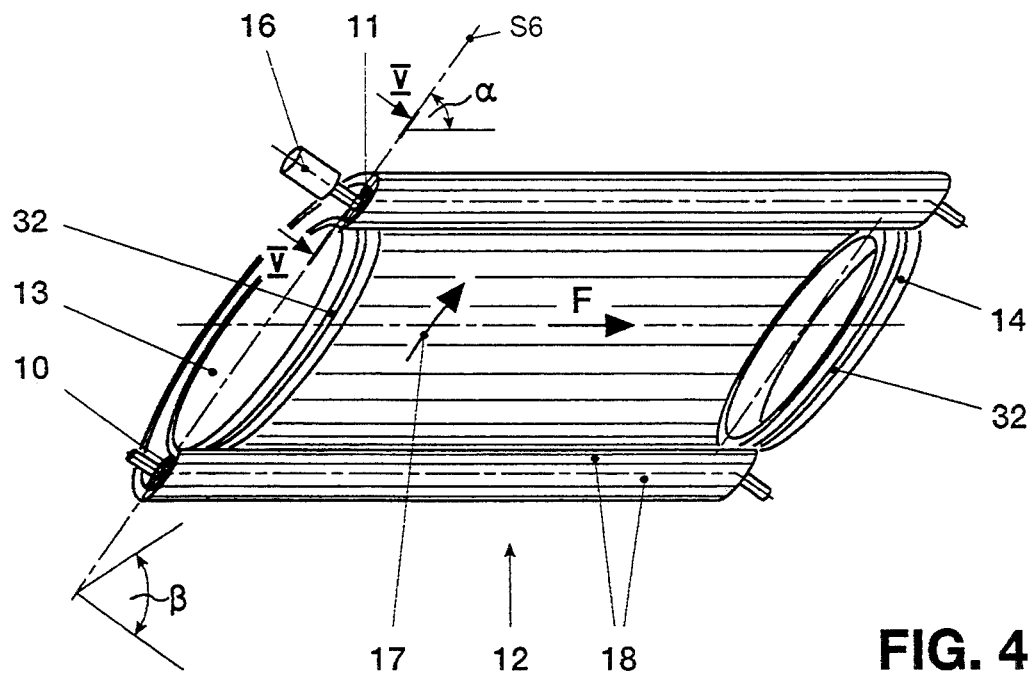
FIG. 4 is a view similar to FIG. 2 of a second embodiment of a troughed belt conveyor.
Figure 5:
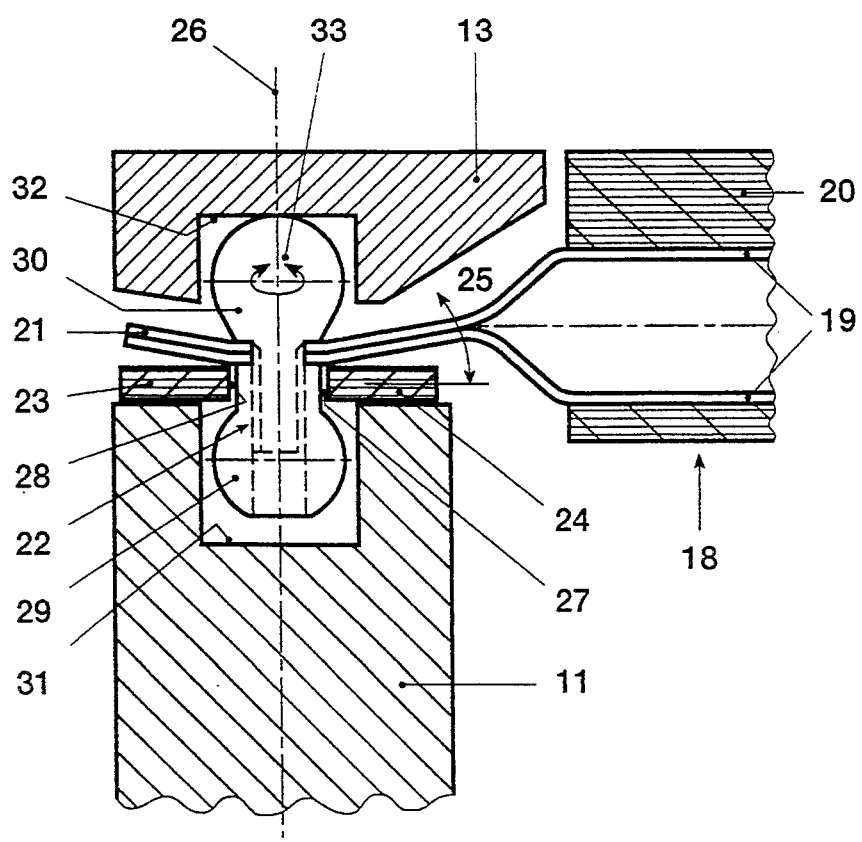
FIG. 5 is a section along the line V—V of FIG. 4.

A variant of the troughed belt conveyor described which has a greater speed of conveyance in the direction of conveyance F is shown in FIG. 4. The end pieces 6 and 7 have been omitted so as to make the drawing clearer. As in the preceding example, they have the same reference plane $S_6\beta$ as the adjoining circular disk 13 or the adjoining ring 14, to which they are directed in parallel. The reference plane is also characterized in FIG. 4 by its trace 6, i.e. by its line of intersection with a horizontal plane as well as by its angle of ascent $\beta$. The angle of ascent $\beta$ in this embodiment is less than 80°. The two end pieces (not shown) are thus inclined to a horizontal plane (differing from the end pieces 6, 7 of the example of FIGS. 1 to 3 which are perpendicular to a horizontal plane). With increasing inclination, i.e. with smaller angle $\beta$, the region of the greatest speed of conveyance shifts in the direction of movement (arrow 17) of the troughed belt 12, i.e. into that region of the trough in which the workpieces mostly stay with the troughed belt rotating.

One possible construction of a troughed belt 12 which is suitable for use both in a troughed belt conveyor according to FIGS. 1 to 3 and in a troughed belt conveyor according to FIG. 4, will be explained below.

The troughed belt 12 has a plurality of bars 18 parallel to the direction of conveyance F, the bars being articulated to each other and so spaced apart from each other and/or so shaped in cross section that the rotating troughed belt can easily adapt itself to the curvatures of the guide rollers 10, 10', 11, 11' and of the circular disk 13 and the ring 14. On the other hand, the distance between bars 18 and their cross-sectional shape are so selected that even the smallest of the workpieces to be processed in the troughed belt conveyor cannot fall through the bars 18 in the trough or jam between them.

Each of the bars 18 has a hollow core 19 of metal, on which a jacket 20 of rubber, plastic or manganese steel is placed as blasting protection. The jacket 20 stops at a distance in front of the two ends of the bar. The jackets 20 of the bars 18 thus form a blasting-protection layer which surrounds the troughed belt. The bars can, however, also be made in one piece of abrasion-resistant material. If the troughed belt conveyor is used for other surface treatments than blasting, the bars 18 can also be shaped correspondingly differently.

The ends of the hollow cores 19 are developed as flat end pieces 21. A guide member 22 connects the end piece 21 movably to an endless strap 23 which may consist of fabric, reinforced plastic, rubber, or the like. Depending on the use of the troughed belt conveyor, a steel belt or a chain may also be suitable instead of the strap 23.

The strap 23 partially surrounds the cylindrical circumferential surface 24 of the guide roller 11 (and similarly the corresponding circumferential surfaces of the guide rollers 11' and 10 and 10'). The connection of the bar 18 to the strap 23 must assure such mobility for the bar 18 that the bar 18 can carry out a swinging movement around the strap 23 and thus around a first swing axis parallel to the strap 23 in the direction indicated by the double-ended arrow 25. The freedom for the swinging motion must be greater the smaller the pitch (angle $\beta$) of the plane $S_6\beta$ or the smaller the angle $\alpha$. The connection between the bar 18 and the strap 23 must, however, also permit a second swinging movement around an axis of swing 26 (double-ended arrow 33) which is directed transverse to the first axis of swing. The swinging path of the bar 18 around the axis 26 must be greater the smaller the angle of inclination α of the end pieces 6, 7 and of the plane $S_6\beta$ with respect to the direction of conveyance F. For this mobility of the bar 18, the connecting member 22 is held form-locked with sufficient play 27 in a hole 28 in the strap 23, which hole is lined in wear-resistant manner (preferably by means of a bushing). The connecting member 22 is provided on both sides of the strap 23 with a spherical head 29 and 30 respectively. The spherical heads 29, 30 lie form-locked, with play sufficient for the swinging movement, within peripheral recesses 31, 32. These recesses 31, 32 prevent the bars 19 from longitudinal displacement in the region of the guide rollers 10, 10', 11, 11' and of the circular disk 13 and the ring 14 and force them onto the oblique path of rotation of the troughed belt. The depressions 32 in the circular disk 13 and ring 14 are continuous peripheral annual grooves. The depressions 31 in the guide rollers 10 and 10' are of similar development.

In the case of the two guide rollers 11, 11' which are forced to travel in the same direction by a gear connection, the depression 32, however, consists of radial holes which are distributed uniformly over the circumference and mesh in the manner of a gear wheel with the spherical heads 30.

If the guide roller 11 is driven by motor 16, the guide roller 11' which is connected by gear with it therewith turns necessarily in the same direction. By the meaning of these guide rollers 11, 11' with the ball heads 30, the troughed belt is driven free of slippage at both ends. A corresponding slip-free drive at both ends of the troughed belt is advisable since slippage occurring at one end of the belt could jam and damage the belt.

The peripheral surfaces of the circular disk 13 and of the ring 14 are tapered in wedge shape towards the annular groove 32. The tapering must be so great that there is sufficient free space for the swinging movement of the end piece 21 around the strap 23 (double-ended arrow 25).

The troughed belt 12 can also be of different development. It is essential that the ends of its bar 18 be swingable relative to the circular disk 13, the ring 14 and the guide rollers 10, 10', 11, 11' around two axes extending at right angles to each other.

Figure 6:
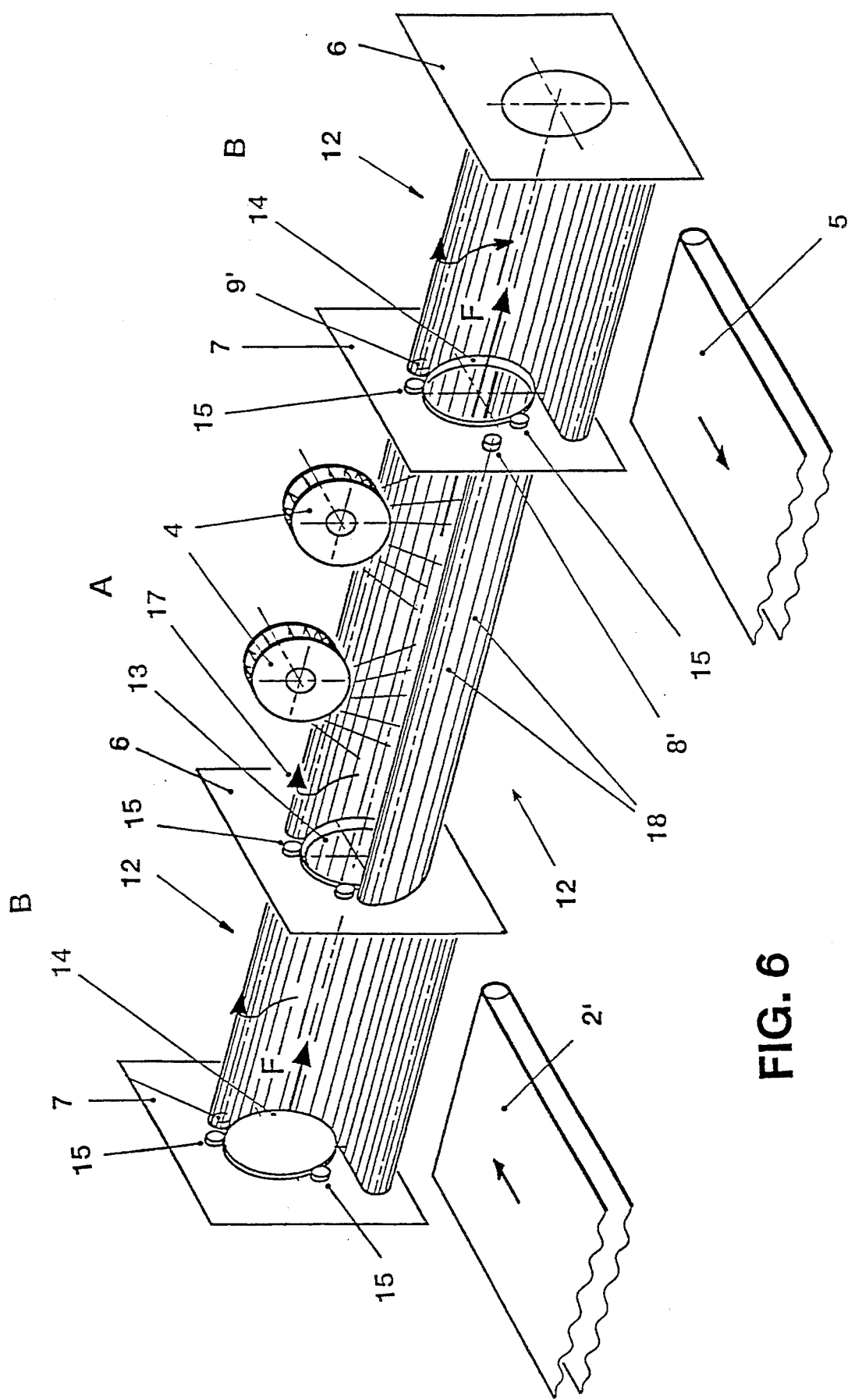
FIG. 6 is a perspective view of three troughed belt conveyors arranged in series.

FIG. 6 shows three troughed belt conveyors A, B of the type described, arranged in series. Their end pieces 6, 7 can be inclined both at an angle α to the direction of conveyance F and at an angle β to the horizontal.

The troughed belt conveyors A and B are of the same construction as that described with reference to FIGS. 1 to 5 with the unimportant difference that, in the case of the troughed belt conveyor A, the near flank extends strongly towards the observer while in the case of the troughed belt conveyors B it extends horizontally or only slightly ascending.

This arrangement serves for the blasting of both small and large workpieces 1. The workpieces are fed by means of a belt conveyor 2' and transferred directly, or via a chute, onto the horizontal flank, moving in the same direction, of the troughed belt 12. On the latter, the workpieces are transported against the steeply ascending flank of the troughed belt 12 and are continuously turned there rolling backwards and at the same time transported in the direction of conveyance (arrow F) by the troughed belt conveyor B to the troughed belt conveyor A. Over the troughed belt conveyor A there are arranged one or more slinger wheels 4, the jet cones of which are directed into the trough thereof and which the workpieces 1 are moved, rotating, in the direction of conveyance F.

Adjoining the second troughed belt conveyor A there is a third troughed belt conveyor B which is developed in the same manner as the first. Its substantially horizontal trough flank adjoins an endless-belt-like removal conveyor 5 to which workpieces can be transferred by a periodic change in direction of rotation of the troughed belt 12.

If several troughed belt conveyors A, B as half-trough (B) or in U-shape (A) are coupled in series to each other, they have common bearing places and in the normal case require only one drive, either on the entrance side or on the discharge side.

This arrangement in series of the troughed belt conveyors A, B provides assurance that even bulky pieces, such as for instance cylinder heads, can always enter into the range of action of the jet cones while rotating around their axis oriented in the direction of conveyance F. In this way, a high grade blast picture is obtained in the case of all workpieces since too late a commencement or the irregular commencement of this rotary movement produces strong differences in the blast picture in the field of action of the jet cones. This problem is solved in a very simple manner by the present invention. In particular, for the blasting of heavy or bulky workpieces, an entrance section in the form of a half mold B with flat entrance is arranged in front of the actual blast molded belt conveyor A. The workpieces supplied by the belt conveyor 2' which is arranged transverse to the direction of conveyance arrive without gradient on the horizontal surface of the half trough and pass, without further aid, into the rotating and forward-traveling movement, If a discharge on the outlet side through the ring 14 is unfavorable (very long and very heavy parts), lateral discharge can be obtained with the same molded felt conveyor B with half mold as at the entrance. The discharge then takes place onto a belt 5 which is parallel to the entrance 21. In this variant, the discharge molded belt conveyor B must be of independent drive and the presence of workpieces must be monitored therein by means of sensors.

I claim:

1. In a device for linearly conveying bodies by a drivable endless flexible troughed belt comprising a plurality of bars which are parallel to each other in a direction of conveyance and articulated to each other and each of ends of the troughed belt being guided, in order to form a trough, around a circular element parallel to a reference plane, the circular element being a ring or a circular disk, the improvement wherein said circular element defines a portion of an orbital path to be traveled by individual ones of said bars, the reference plane forms a line of intersection, inclined to the direction of conveyance, with a horizontal plane and the ends of the troughed belt are guided on the circular element such that said bars are swingable on their orbital path around a first swing axis which is parallel to the orbital path.

2. The device for linearly conveying bodies, according to claim 1, further comprising
guide rollers,
the troughed belt together with the circular element are guided and supported respectively on said guide rollers which are paraxial to said circular element.

3. The device for linearly conveying bodies, according to claim 1, wherein
said reference plane intersects said horizontal plane at an acute angle.

4. The device for linearly conveying bodies, according to claim 2, wherein
ends of the bars are swingable, additionally, around a second swing axis which is transverse to said to said first swing axis.

5. The device for linearly conveying bodies, according to claim 1, wherein
the troughed belt has on each of its ends an endless strand, and ends of the bars are articulated to said strand swingable around at least said first swing axis.

6. The device for linearly conveying bodies, according to claim 2, wherein
ends of the bars are secured against displacement in longitudinal direction in a region of said circular element as well as of said guide rollers.

7. The device for linearly conveying bodies, according to claim 6, wherein
the ends of the bars are held form-locked, with clearance, in longitudinal direction of the bars by the circular element as well as the guide rollers.

8. The device for linearly conveying bodies, according to claim 1, further comprising
two guide rollers drivable synchronously in a same direction, and
each of said ends of the troughed belt engages in form-locked manner with one of said guide rollers.

9. The device for linearly conveying bodies, according to claim 5, further comprising
guide rollers which engage said troughed belt,
depressions formed circumferential surfaces of the circular element and of the guide rollers, and
said ends of the bars have, on both sides, projections which engage into said depressions.

10. The device for linearly conveying bodies, according to claim 9, wherein
two of said guide rollers are drivable synchronously in a same direction and respectively drivingly engage respective of said ends of the troughed belt,
the depressions in said two guide rollers are developed as holes which engage with the projections, and the depressions in the circular element and other of said guide rollers are annular grooves.

11. The device for linearly conveying bodies, according to claim 10, wherein
said projections are formed as spherical heads.

12. The device for linearly conveying bodies, according to claim 1, further comprising
distribution means arranged above the trough, said distribution means being slinger wheels or jet nozzles, wherein a jet cone of said distribution means is directed into the trough.

13. The device for linearly conveying bodies, according to claim 1, wherein
a longitudinal edge of one of said bars serves as a leading flank in direction of the path of rotation which is directed approximately horizontally.

14. A device for linearly conveying bodies by a drivable endless flexible troughed belt comprising:
a plurality of bars which are parallel to each other in a direction of conveyance and articulated to each other;
orbital path guide means including a circular element for defining an orbital path of travel of said bars;
wherein ends of the troughed belt are guided, in order to form a trough, around said circular element, said circular element being disposed parallel to a reference plane; and
the reference plane forms a line of intersection, inclined to the direction of conveyance, with a horizontal plane and the ends of the troughed belt are guided on the circular element such that said bars are swingable on their orbital path around a first swing axis which is parallel to the orbital path.

* * * * *